(12) United States Patent
Chenard

(10) Patent No.: US 7,099,533 B1
(45) Date of Patent: Aug. 29, 2006

(54) FIBER OPTIC INFRARED LASER BEAM DELIVERY SYSTEM

(76) Inventor: François Chenard, 782 rue de la Fresniere, Quebec, Quebec (CA) G1X 2N7

( * ) Notice: Subject to any disclaimer, the term of this patent is extended or adjusted under 35 U.S.C. 154(b) by 0 days.

(21) Appl. No.: 11/268,052

(22) Filed: Nov. 8, 2005

(51) Int. Cl.
*G02B 6/42* (2006.01)

(52) U.S. Cl. .......................... 385/31; 385/33; 385/120; 372/103; 428/364

(58) Field of Classification Search ............ 385/31–33, 385/115, 120; 372/6, 103; 428/364
See application file for complete search history.

(56) References Cited

U.S. PATENT DOCUMENTS

| | | | |
|---|---|---|---|
| 4,676,586 | A | 6/1987 | Jones et al. |
| 4,762,385 | A | 8/1988 | Fuse |
| 4,812,641 | A | 3/1989 | Ortiz Jr. |
| 5,440,664 | A | 8/1995 | Harrington et al. |
| 5,778,125 | A | 7/1998 | Busse et al. |
| 6,898,359 | B1 | 5/2005 | Soljacic et al. |
| 2002/0025130 | A1 | 2/2002 | Fink et al. |
| 2005/0025965 | A1* | 2/2005 | Sanghera et al. ........... 428/364 |
| 2005/0074215 | A1 | 4/2005 | Sanghera et al. |

OTHER PUBLICATIONS

Ricky, K. Nubling and James A. Harrington; Hollow-waveguide delivery systems for high-power, industrial C02 lasers; Applied Optics; Jan. 20, 1996; pp. 372-380; vol. 34, No. 3; Optical Society of America; New Jersey, USA.

T.A. Birks, P.J. Roberts, P.St.J. Russel, D.M. Atkin and T.J. Shepherd; Full 2-D photonic bandgaps in silica/air structures; Electronics Letters; Oct. 26, 1995; pp. 1941-1943; vol. 31, No. 22.

* cited by examiner

*Primary Examiner*—Phan Palmer
(74) *Attorney, Agent, or Firm*—George J. Primak

(57) ABSTRACT

A laser beam delivery system is disclosed, which allows transmission of high-power infrared light through a hollow core photonic band gap (HC-PBG) fiber made of non-silica-based glass. In this system, the infrared beam first passes through input coupling optics which focus the beam onto the hollow core of the HC-PBG fiber. In front of the input end of the HC-PBG fiber, there is provided a mask with a hole aligned with the hollow core, and the infrared beam first passes through this hole before entering the hollow core of the HC-PBG fiber. This protects the photonic band gap structure from being damaged by the beam. After passing through the HC-PBG fiber, which may be from one to several hundred meters in length, the infrared beam exits at the output end of the fiber and passes through output coupling optics which collimate and focus the beam onto a desired target. The various components of the system may be water cooled during the operation or subjected to a gas purge to prevent condensation or gas ionization.

20 Claims, 4 Drawing Sheets

FIBER OPTIC INFRARED LASER BEAM DELIVERY SYSTEM

BACKGROUND OF THE INVENTION

1. Field of the Invention

This invention relates generally to a laser beam delivery system suitable to deliver the output of an infrared laser device to a remote location through a flexible fiber optic cable. More particularly, it relates to a laser beam delivery system that uses a hollow-core photonic band gap (HC-PBG) fiber made of a non-silica-based glass to transmit a high-power or high-energy laser beam while preserving the high laser beam quality at the system output.

2. Description of the Prior Art

The use of fused silica glass fiber in fiber optic laser beam delivery systems to deliver laser radiation has been demonstrated in the early 1980's. In particular, silica fiber with large core diameter of 50–1000 µm is being commonly used to transmit several watts to several kilowatts of laser power for applications like welding, machining, marking or laser surgery. For example, U.S. Pat. No. 4,676,586 describes one such fiber optic laser beam delivery system for high power transmission. But large core silica fiber cannot currently be used for high beam quality processes because of the highly multimode nature of these fibers. Furthermore, as is known, fused silica fiber is limited to transmission in the wavelength range of about 0.2 to 2 µm, and cannot be used in laser beam delivery outside this range.

There are many useful lasers that operate at wavelengths above 2 µm in the infrared region. Among these, there is the Er:YAG laser (~10 W at 2.94 µm) and the Cr, Er:YSGG laser (~10 W at 2.78 µm) which are used for medical and dental applications. Also, $CO_2$ lasers emit 10 to 10,000 W at 10.6 µm and are used mainly in industrial applications, but also in medical applications.

Many optical fibers have been developed to transmit infrared laser power radiation at wavelengths beyond 2 µm. Thus, germanate glass fiber based on $GeO_2$ is manufactured by Infrared Fiber System (Silver Spring, Md., USA) and transmits from 1 to 3 µm. Large core and highly multimode germanate fiber (150–500 µm) has been used to transmit up to 20 W (2J at 10 Hz) of Er:YAG laser. Single crystal sapphire optical fiber is another commercially available infrared fiber which is manufactured by Photran (Poway, Calif., USA) and is transparent from the visible to 3.5 µm. Sapphire fiber growth method is slow (few mm/min) and produces only a fiber with a large diameter of 150–450 µm and a length of less than 2 m. The sapphire fiber core is highly multimode and has been used to deliver over 10 W of average power from an Er:YAG laser operating at 2.94 µm.

Hollow glass waveguide (HGW) is another infrared transmitting fiber. HGW fiber was developed at Rutgers University, Piscataway, N.Y., USA and is disclosed in U.S. Pat. No. 5,440,664. HGW fiber is fabricated using wet-chemistry methods to deposit a dielectric-enhanced metal layer inside silica glass tubing. The silica glass tubing used has a polymer or polyimide coating on the outside surface to preserve mechanical strength. HGW fiber has been used for high-power $CO_2$ laser transmission (see R. K. Nubling and J. A. Harrington, "Hollow-waveguide delivery systems for high-power, industrial $CO_2$ lasers", Appl. Opt., vol. 34, No. 3, 20 Jan. 1996, p. 372–280). HGW fiber offers two main advantages because of the air guiding core: first it allows high laser induced damage threshold (LIDT), namely more than 1000 W of $CO_2$ laser; and second it has very low insertion loss because there are no Fresnel reflection losses at the ends of the HGW fiber. However, transmission losses of the HGW fiber vary as $1/a^3$ where a is the bore radius and, therefore, the loss can be arbitrarily small for a sufficiently large core (300–1000 µm). Another disadvantage of the HGW fiber is the added loss on bending which is also polarization sensitive. This means that the output power as well as the output beam profile vary significantly with different bending radius of the HGW fiber and/or polarization state of the input beam.

All of the above mentioned infrared delivery fibers offer some viable solutions and some drawbacks for the transmission of high power infrared lasers. But none of them can transmit efficiently stable high power infrared laser radiation with singlemode beam quality.

During the past ten years, researchers have developed a new class of optical fiber called photonic crystal fiber (PCF), also known as microstructured or holey fiber, which can combine large core dimension and Gaussian-like fundamental mode transmission. Broadly speaking, PCF may be defined as a fiber having a core surrounded by a periodically cladding structure, in which the periodic variation appears in directions perpendicular to the fiber axis, whereas the structures are invariant along the fiber axis. Of particular interest is the hollow-core photonic band gap (HC-PBG) fiber where the light is guided in a hollow core surrounded by a periodically cladding structure. Silica glass HC-PBG fiber was first disclosed in 1995 (Full 2-D Photonic Bandgaps in Silica/Air Structures, Birks et al., Electronics Letters, Vol. 31 (22), p. 1941–1943, 26 Oct. 1995). Crystal Fibre of Birkerød, Denmark manufactures a silica HC-PBG fiber to guide light in air and to deliver very high laser peak power while preserving an almost perfect output beam quality. But silica glass HC-PBG fiber does not transmit well beyond 2 µm since several percent of the light propagates in the periodically cladding region and this light is highly attenuated through absorption in silica.

Recently, researchers at the Naval Research Laboratory, USA, have developed a novel HC-PBG fiber. U.S. Patent Application Publication No US 2005/0074215 A1 discloses a HC-PBG fiber made of non-silica-based glass such as chalcogenide, germanate, phosphate, tellurite, borate, antimonate and halide to transmit infrared light. The non-silica-based glass is a low melting temperature glass (~300° C.) and can transmit light from 1 to 15 µm depending on the composition. This infrared transmitting HC-PBG fiber features a hollow core surrounded by an array of air holes in the non-silica-based glass periodically cladding structure. The surface of the holes in the periodically cladding region surrounding the hollow core can be very thin and very easy to damage. Hence the combination of low-melting temperature of the non-silica-based glass material, of fragile thin holes surface and of high power laser, make the non-silica-based glass HC-PBG fiber practically impossible to use directly to deliver high power infrared laser.

Another type of HC-PBG fiber is disclosed in U.S. Pat. No. 6,898,359 wherein the periodically cladding region is arranged concentrically around the hollow core and the photonic band gap effect is provided with successive layers of high and low index of refraction. This structure can also be designed to transmit infrared light ranging from 2–12 µm, provided a suitable delivery system can be designed.

Consequently, there is a need for a delivery system that would make use of non-silica-based glass HC-PBG fiber for transmission of high power laser in the infrared.

OBJECTS AND SUMMARY OF THE INVENTION

It is an object of the present invention to provide a delivery system for an infrared laser beam, using a non-silica-based glass hollow-core photonic band gap (HC-PBG) fiber as a means to transmit the infrared light.

Another object of the present invention is to provide a delivery system using the non-silica glass based HC-PBG fiber with quasi-Gaussian fundamental mode field distribution, adapted to transmit infrared light between 2 and 15 µm.

A still further object of the invention is to use the novel fiber optic laser beam delivery system made for transmission of high power source, exceeding intensity of 10 MW/cm$^2$ for pulsed laser or exceeding power of 10 W for continuous wave laser.

Other objects and advantages of the invention will be apparent from the following description thereof.

In essence, the fiber optic infrared laser beam delivery system of the present invention comprises the following components:
 (a) input coupling optics adapted to focus an infrared laser beam onto a predetermined focal spot;
 (b) a hollow core photonic band gap (HC-PBG) fiber made of non-silica-based glass and having an input end and an output end, said HC-PBG fiber being held by a holding fixture in a position such that its input end faces the input coupling optics and its hollow core at the input end constitutes the predetermined focal spot onto which the infrared laser beam is focused;
 (c) a mask with an aperture having the same or slightly smaller diameter than that of the hollow core of the HC-PBG fiber, provided between the input coupling optics and the input end of the HC-PBG fiber, said mask being positioned so that its aperture is aligned with the hollow core and so that the infrared laser beam focused onto the hollow core first passes through the aperture of the mask and then enters the hollow core without touching any photonic band gap structure of the HC-PBG fiber that surrounds the hollow core at the input end; and
 (d) output coupling optics for the infrared laser beam emerging from the output end of the HC-PBG fiber.

The infrared laser used with the novel delivery system should be able to operate at wavelengths above 2 µm, and preferably at 2–15 µm, and to emit a beam of high power, for example $\geq$10 MW/cm$^2$ pulsed wave or $\geq$10 W continuous wave. Lasers such as Er:YAG laser, CR, Er:YSGG laser and $CO_2$ laser are suitable for such applications.

The input coupling optics preferably comprise a beam expander and a focusing element. The beam expander typically combines at least two lenses to offer a desired magnification of the laser beam; it is normally used to expand the incoming laser beam only when the F number (defined as the ratio of the focusing element over the collimated laser beam diameter on said focusing element) of the input coupling optics must be lowered to achieve a small focal spot.

The HC-PBG fiber normally has a quasi-Gaussian fundamental mode field distribution. It can be made of materials such as chalcogenide glass, germanate glass, phosphate glass, telluride glass, borate glass, antimonate glass and halide glass, with the preferred material being chalcogenide glass. It is held in proper position by means of a suitable holding fixture which surrounds and supports the input end of the HC-PBG fiber. Preferably, the HC-PBG fiber is supported by the holding fixture beyond the beam admitting end, to reduce the level of heat at the holding location; thus, the HC-PBG fiber projects out of the holding fixture over a small distance at the input end, typically one millimeter, although this projection may take place within a central recess formed in the holding fixture. The HC-PBG fiber may be of any desired design. For example, it can have a hollow core in the form of a longitudinal central opening, a microstructured periodically cladding region with a plurality of longitudinal surrounding openings and a jacket, plus a soft protective coating which is removed from the end of the fiber cable when it is inserted into the holding fixture. It can also be of a design where the periodically cladding region is arranged concentrically around the hollow core.

The mask is needed to insure that the laser beam does not touch the photonic band gap structure surrounding the hollow core of the HC-PBG fiber at the input end, which is constituted of a fragile periodically cladding region of the fiber. The mask is placed in close proximity of the HC-PBG fiber, typically within 1 mm from the input end of the fiber, with the aperture of the mask and the hollow core of the fiber being precisely aligned on the same optical axis. The mask can be made, for example, of a copper foil supported with a black anodized aluminum mount. Copper is suitable because of its high reflectivity which can further be enhanced by means of a gold plated film on one side of the mask. Other materials, such as alumina ceramic and diamond, can also be used to fabricate the mask.

Because copper has a high thermal conductivity, cooling can be used to increase the so-called aperture laser induced damage threshold (LIDT). For example, water cooling can be used selectively for one or more or all of the components of the laser beam delivery system, including the laser source itself, in order to reduce the amount of heat produced by the high power laser beam.

The output coupling optics generally include a lens suitable to collimate the laser beam emerging from the output end of the HC-PBG fiber and/or another lens to focus the collimated beam onto a target. The focusing lens may be a separate item from the collimating lens and need not be part of the output coupling optics.

It is possible that condensation and/or gas ionization may occur at the input coupling optics, the mask, the HC-PBG fiber cable and/or the output coupling optics. A purge gas injection can selectively be used for one or more or all of these components of the laser beam delivery system to prevent such condensation and/or gas ionization, thereby avoiding any distortion or damage that they may produce.

The present invention will now further be described with reference to the appended drawings which illustrate various non-limitative embodiments of the invention.

DETAILED DESCRIPTION OF THE PREFERRED EMBODIMENTS

Figure 1A:
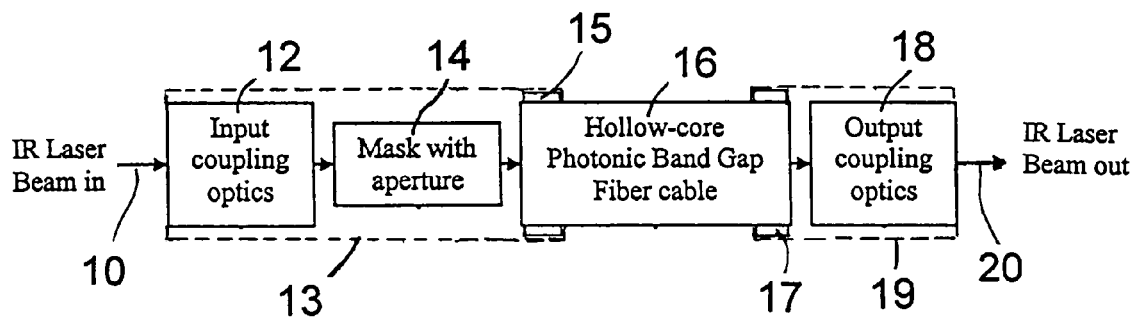
FIG. 1a and FIG. 1b are schematic block diagrams illustrating the fiber optic laser beam delivery system of the present invention in its basic embodiment and a more detailed embodiment respectively.

In the drawings in which the same elements are designated by the same reference numbers, FIG. 1a is a block diagram illustrating the basic fiber optic laser beam delivery system of the present invention. As illustrated in this figure, an infrared (IR) laser beam is projected, as shown by arrow 10, into input coupling optics 12 by which the beam is focused so as to pass through the aperture of the mask 14 and be coupled into the hollow-core photonic band gap (HC-PBG) fiber cable 16. The HC-PBG fiber cable 16 may have a length typically ranging from one meter to several hundred meters. The IR laser beam is transmitted through and exits the HC-PBG fiber cable 16 into output coupling optics 18 from which it emerges as shown by arrow 20. The output coupling optics are adapted to collimate the output IR laser beam and eventually to focus it onto a desired target spot. In order to maintain satisfactory alignment between the various components, it is preferable that the input coupling optics 12, the mask 14 and the input end 15 of the HC-PBG fiber cable 16, be fixed on a common supporting fixture 13 shown in FIG. 1a in a broken line because it is a preferential feature rather than essential. Also, for the same reason, it is preferable to fix the output coupling optics 18 and the output end 17 of the HC-PBG fiber cable 16 on a common supporting fixture 19 also shown in a broken line. In each case, the common supporting fixture should preferably be made of a material that would minimize mechanical vibration and thermal expansion.

Figure 1B:
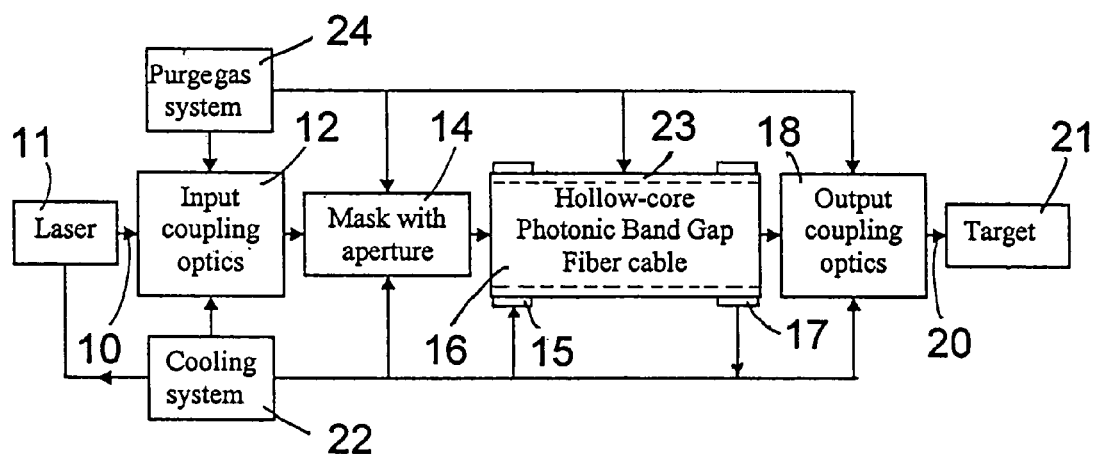

FIG. 1b is a block diagram that illustrates a more detailed embodiment of the fiber optic laser beam delivery system pursuant to the present invention. In this embodiment, a laser source 11 is used to emit the IR laser beam as shown by arrow 10, which is coupled into the HC-PBG fiber cable 16 through the input coupling optics 12 and the mask 14 with an aperture through which the IR laser beam passes just before its coupling into the cable 16. The laser source may, for example, be a high-power 10.6 μm $CO_2$ laser exceeding intensity of 10 MW/cm$^2$ for pulsed laser or exceeding power of 10 W for continuous wave laser. After coupling into the HC-PBG fiber cable 16, the IR laser beam is transferred thereby to a desired location and exits said cable 16 into output coupling optics 18 by which it is collimated and eventually focused onto a desired target 21.

A cooling system 22 is provided in this embodiment to cool selectively the laser source 11, the input coupling optics 12, the mask 14, the HC-PBG fiber cable 16 and/or the output coupling optics 18. The cooling medium is normally water and the various components of the fiber optic beam delivery system are provided with suitable watertight jackets and fittings through which water is circulated for cooling purposes. Cooling of some or all of the components of fiber optic beam delivery system may be needed to avoid thermal damage, particularly when using very high powered lasers. In particular, for the water cooling of the cable 16, a watertight jacket 23 is provided within said cable 16 and means are provided at the input end 15 and the output end 17 of the HC-PBG cable 16 for inlet and outlet of water circulation. These means consist of suitable watertight fittings.

Also, when a pulsed laser beam with irradiance of $\geq 10$ GW/cm$^2$ or a continuous wave laser beam with intensity of $\geq 50$ MW/cm$^2$ interacts with air near atmospheric pressure, a high-temperature, high electron density laser spark or micro plasma may be formed. The temperature of this plasma, initially, is very hot, namely $10^4$ to $10^{7\circ}$ C. At such a high temperature, any sample material is broken down and vaporized. This plasma is caused by the ionization of air under the very high laser irradiance. In order to prevent such laser spark inside the beam expander of the input coupling optics 12 and/or at the aperture of the mask 14 and/or at the input and output ends of the HC-PBG fiber cable 16, one can selectively purge these components with a gas having high laser breakdown properties. Sulfur hexafluoride ($SF_6$) gas or carbon dioxide ($CO_2$) gas in combination with nitrogen ($N_2$) gas are being used in the electric power industry because of their excellent dielectric and arc-quenching properties. These gases or other similar ones can be used as well to prevent laser-induced spark and ionization in the system of the present invention.

Moreover, dry nitrogen ($N_2$) gas can be used to purge selectively the input coupling optics 12, and/or the mask 14 with aperture, and/or the HC-PBG fiber cable 16 and/or the output coupling optics 18 to prevent any condensation that could reduce the transmission and cause damage.

A purge gas system 24 comprising a sealed package with proper fittings may be used to deliver the purge gas to the components. An additional benefit of using the purge gas is the convection cooling effect that it produces, which increases the laser induced damage threshold (LIDT) of the components.

Figure 2A:
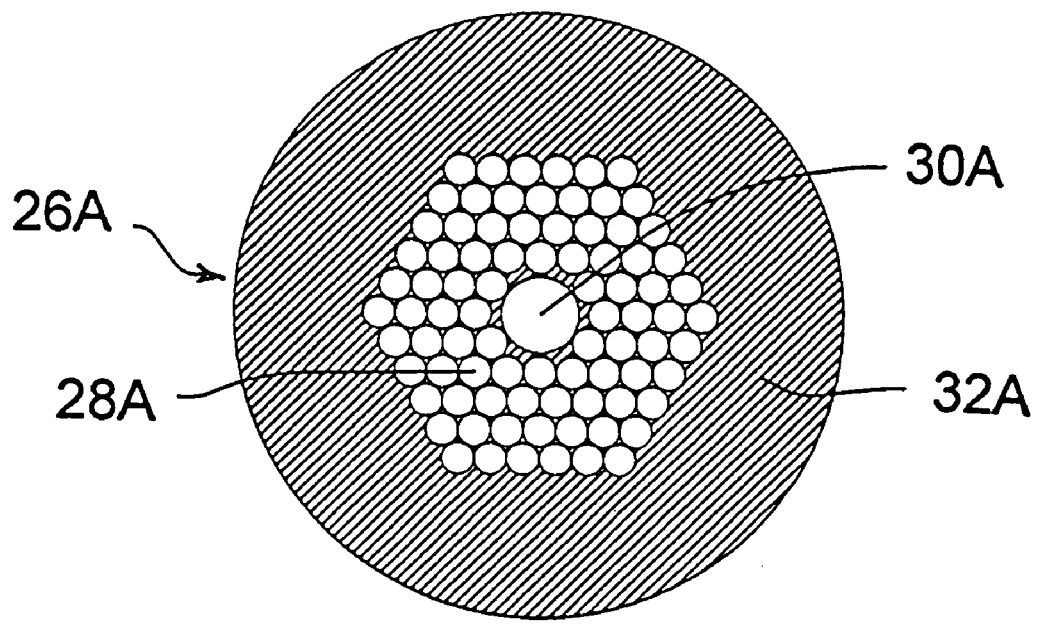
FIG. 2a and FIG. 2b are schematic illustrations of the cross-section of the hollow-core photonic band gap fibers suitable for the purposes of the present invention.
Figure 2B:
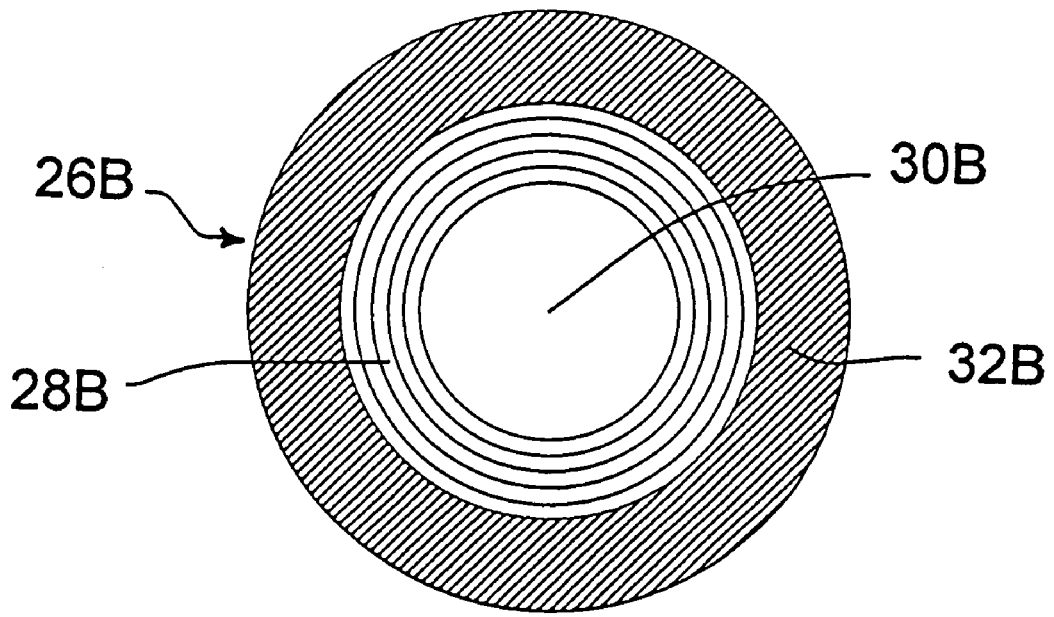

FIG. 2a and FIG. 2b illustrate the cross-sections of two HC-PBG fiber designs suitable for the purposes of the present invention. FIG. 2a shows the cross-section of a HC-PBG fiber 26A where the air holes 28A surrounding the hollow core 30A provide the photonic band gap effect which reflects the light inside the hollow core and allows the transmission for a range of selected wavelengths. In FIG. 2a, the air holes forming the periodically cladding region are arranged in a hexagonal pattern. U.S. Patent application publications US2005/0025965 A1 and US 2005/0074215 A1 disclose such design and the fabrication of the HC-PBG fiber made of non-silica-based glass such as chalcogenide, germanate, phosphate, tellurite, borate, antimonate, and halide to transmit infrared light.

For example, selenide glass is a chalcogenide that is transparent from 2 μm up to 10 μm. In one preferred embodiment of this invention, selenide glass is used to make the solid region 32A of the HC-PBG fiber 26A for the transmission of a $CO_2$ laser beam at 10.6 μm. The bare HC-PBG fiber 26A is usually covered with a soft protective coating (not shown) to improve mechanical strength. Also, for the purposes of the present invention, a watertight jacket 23 (FIG. 1b) may be provided over the fiber 26A for purposes of water cooling. This combination of the HC-PBG fiber with the soft protective coating and the watertight jacket is identified as the hollow-core photonic band gap fiber cable 16 in FIG. 1b.

Currently, $CO_2$ laser beam delivery for material processing is accomplished through the use of an ensemble of mirrors and prisms for beam steering. However, an increase in beam steering flexibility can be achieved if $CO_2$ laser beam is passed through an optical fiber, such as illustrated in FIG. 2a. Typically, the diameter of the hollow core 30A is 3 to 5 times the distance between air hole centers in the periodically cladding region 28A. The distance between the air hole centers surrounding the hollow core 30A is 2–3 times the wavelength of the laser used for transmission. Also, the air fill fraction (ratio of open space to glass in the periodically cladding region) is 30–99%, more likely >90%. In one preferred embodiment, the selenide glass HC-PBG fiber 26A design to transmit $CO_2$ laser beam at 10.6 µm has an air fill factor of 90%, a hollow core diameter of 75 µm, a distance between air hole centers of 25 µm and a 750 µm outside diameter.

FIG. 2b shows the cross-section of another example of HC-PBG fiber 26B. In this case, the periodically cladding region 28B is arranged concentrically around the hollow core 30B. U.S. Pat. No. 6,898,359 discloses such a design as well as the material selection and the applications of such high index-contrast fiber waveguide. The photonic band gap effect is provided with successive layers of high and low index of refraction in the periodically cladding region 28B. In one preferred embodiment, the periodically cladding region 28B can be a combination of chalcogenide glass and another material such as an oxide glass, a halide glass, or even a polymer. The cladding region 32B is used for handling the HC-PBG fiber 26B. Such HC-PBG fiber can be designed to transmit infrared light ranging from 2–12 µm. As is the case of the design of FIG. 2a, the HC-PBG fiber of FIG. 2b is also usually covered with a soft protective coating to improve mechanical strength and is provided with a watertight jacket if water cooling of the resulting cable is desired.

Figure 3A:
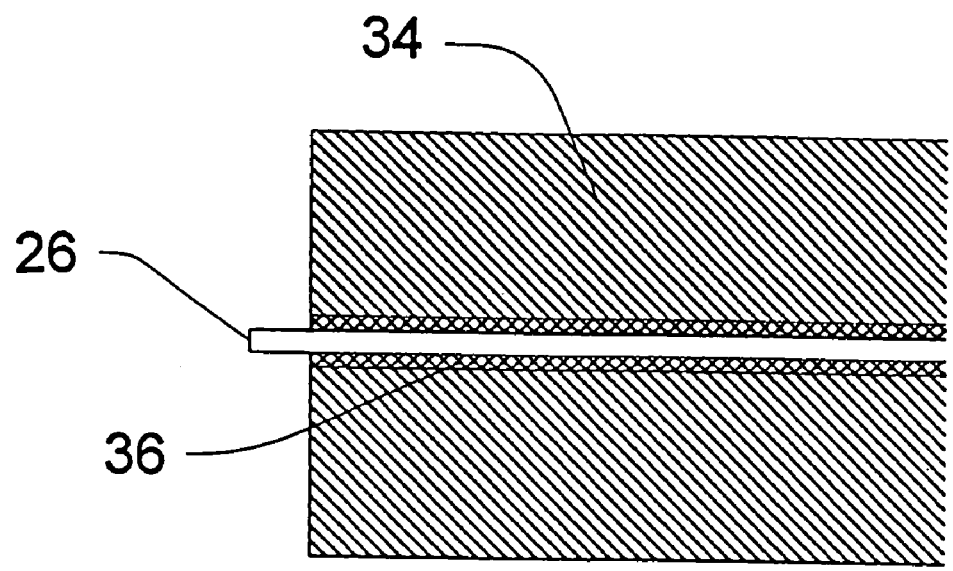
FIG. 3a and FIG. 3b illustrate preferred embodiments of the holding fixtures adapted to hold the input end of the hollow-core photonic band gap fiber in proper position.
Figure 3B:
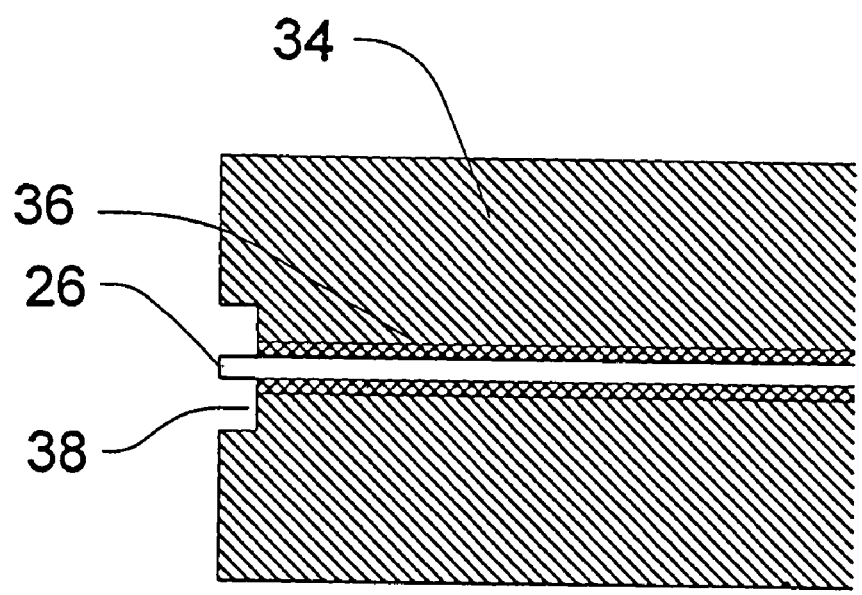

FIG. 3a and FIG. 3b illustrate preferred embodiments of the holding fixtures to hold the HC-PBG fiber ends. The HC-PBG fiber 26 (which can have the design of the fiber 26A or 26B shown in FIG. 2a and FIG. 2b) is supported at a location remote from the IR laser beam admitting end, thus reducing the level of heat at the holding location. In the specific embodiment illustrated in FIG. 3a, coupling takes place through a holding fixture 34 made of brass. The HC-PBG fiber 26 protrudes from the holding fixture 34 over some distance, typically one millimeter. The soft protective coating on the end of the HC-PBG fiber 26 has been removed to insert the HC-PBG fiber 26 into the hole of the holding fixture 34 which has a diameter slightly larger than that of the fiber 26. The length of the holding fixture 34 is typically between 2 and 3 cm and its diameter is about 1 cm. These dimensions are, of course, not limitative and the holding fixture may have any desired shape. Also, metals other than brass can be used so long as they have good thermal conductivity and are easily machined. For example, copper and aluminum would also be suitable. In a preferred embodiment, the holding fixture 34 is water cooled to evacuate any heat that can occur at the input end of the HC-PBG fiber 26 because of laser beam misalignment, coupling loss, or fiber transmission loss. Duralco™ thermal conductive epoxy 36 made by Cotronics Corp., Brooklyn, N.Y., may be used to fix the HC-PBG fiber 26 within the holding fixture 34 and to provide good thermal contact. Other thermally conductive epoxy resins can also be used for this purpose.

FIG. 3b is another illustration of a holding fixture 34 where a counterbore 38 forms a central recess or an open annular air gap around the end of the HC-PBG fiber 26. Again, in a preferred embodiment, the holding fixture 34 is made of brass and is water cooled for heat dissipation, and Duralco™ thermal conductive epoxy 36 is used to glue the HC-PBG fiber 26 into the holding fixture 34. The length of HC-PBG fiber 26 in the counterbore opening is typically the counterbore depth, which is usually one millimeter or so, and the counterbore diameter is typically more than one millimeter. One advantage to use the counterbore 38 is to provide a better protection for accidentally touching and damaging the HC-PBG fiber 26.

The HC-PBG fiber 26 made of selenide glass will exhibit some transmission loss at 10.6 µm for the $CO_2$ laser. The guided beam is transmitted mainly in the hollow core and in the surrounding air holes, but there is still a slight portion of the laser beam (less than 5%) passing through the selenide glass. The estimated transmission loss at 10.6 µm for the selenide glass HC-PBG fiber is 0.2 dB/m. This means that there will be approximately 4.5 W of absorbed $CO_2$ laser beam every meter along the HC-PBG fiber for every 100 W of input power. The absorbed power generates heat which can limit the maximum power handling capability of the HC-PBG fiber. A water cooled jacket is used to remove the heat and keep the HC-PBG fiber sufficiently cool. Standard jacket tubing used for water cooling is inserted over the selenide HC-PBG fiber. Watertight fittings are used at each end of the water cooled jacket and connected to the fiber holding fixtures. For this reason, when water cooling is used, holding fixtures are provided at each end of the HC-PBG fiber. Water cooling is forced through the jacket tubing and the holding fixtures. However, no water is admitted inside the hollow core or in the air holes of the periodically cladding region.

Figure 4:
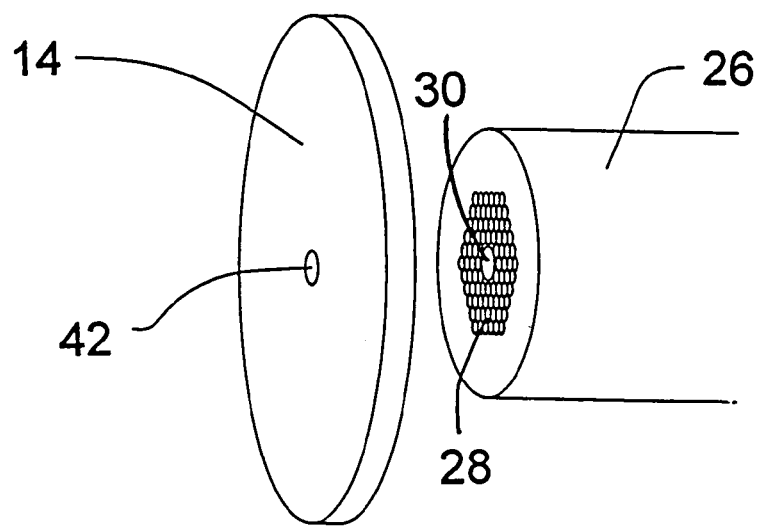
FIG. 4 shows a preferred embodiment of the mask with its aperture aligned with the hollow-core photonic band gap fiber.

Even with the special holding fixtures and the cooling jacket device, various problems may be encountered when more than a few tens of Watts of $CO_2$ laser beam at 10.6 µm are focused onto the small area of the input end of the selenide HC-PBG fiber, namely its hollow core which is typically 75 µm in diameter. Any beam misalignment, coupling loss, or beam spillage can result in laser induced damage of the very thin holes surface in the periodically cladding region surrounding the hollow core and leading to catastrophic damage. Selenide glass is a low-melting material (~300° C.) which melts and is damaged with just tens of Watts of 10.6 µm $CO_2$ laser power. To avoid such damage, as shown in FIG. 4, there is provided a mask 14 with an aperture 42 at the input end of the HC-PBG fiber 26. The diameter of the aperture 42 is the same or slightly smaller than the diameter of the hollow core 30 to prevent any laser beam from touching the fragile periodically cladding region 28 surrounding the hollow core 30. The mask 14 is placed in close proximity to the HC-PBG fiber 26 with the aperture 42 and hollow core 30 precisely aligned on the same optical axis. Preferably, the mask 40 should be placed as close as possible to the end of the fiber 26 but without touching the same. This can be done under the microscope with a precise positioning system or directly with the laser beam transmission optimization. In a preferred embodiment, the mask 14 is made of 18 µm thick copper foil and supported with a black anodized aluminum mount of 25 mm diameter and 1.25 mm thick. The diameter of the aperture 42 can be selected to fit the hollow core diameter 30 within 7%. For the 10.6 µm $CO_2$ laser transmission, an aperture diameter of 75 µm+0/−5 µm to fit the 75 µm hollow core is provided. Copper is highly reflective at 10.6 µm wavelength for the $CO_2$ laser and can therefore be used with advantage for this purpose. The copper reflectivity can further be enhanced with gold plated film on one side of the mask. Furthermore, copper has a very high thermal conductivity of 400 W/m/K, and water cooling can be used in a preferred embodiment to increase the aperture's laser-induced damage threshold (LIDT). Other materials such as alumina ceramic 250 µm thick or diamond 200 µm thick can also be used to fabricate the mask with the appropriate aperture diameter. Although they have higher melting temperature than copper, these other materials do not perform as well for thermal conductivity and do not have as high a reflectivity in the infrared as copper.

Figure 5:
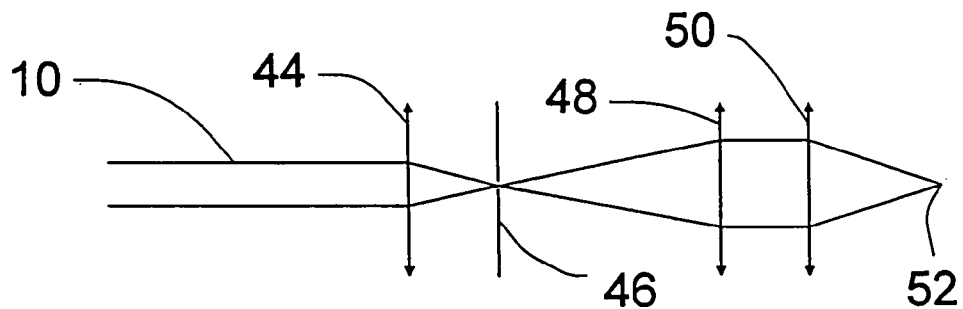
FIG. 5 illustrates a preferred embodiment of the optical components of the input coupling optics used to couple the incoming laser beam into the hollow-core photonic band gap fiber.

A preferred embodiment of the input coupling optics 12 (FIGS. 1a and 1b) is illustrated in FIG. 5. The input coupling optics focuses the collimated laser beam 10 to a focal spot 52 at the aperture 42 of mask 14 (see FIG. 4). The input coupling optics may consist of a beam expander (44, 46 and 48) and a focusing element 50. The beam expander combines at least two lenses (44 and 48) to offer a magnification. The ratio of the longer focal lens 48 over the shorter focal lens 44 gives the level of magnification. For example, one may select a 2.5 cm focal length ZnSe lens as the shorter focal lens 44 and a 5 cm focal length ZnSe lens as the longer focal lens 48 to produce a magnification of two and double the diameter of the laser beam 10 of a $CO_2$ laser. Good quality ZnSe meniscus lenses are used with antireflection coating of 10.6 μm on both surfaces. The aperture 46 between the two lenses can be used to spatially filter the laser beam if necessary, or it can be used to optically align the laser beam through the input coupling optics. Aperture 46 can be made in copper, alumina ceramic or diamond material. The size of the focal spot 52 is directly proportional to the F number of the input coupling optics. In the present example, the F number of the input coupling optics is defined as the ratio of the focal length of the focusing element 50 over the collimated laser beam diameter on the same focusing element 50. The beam expander is used to expand the incoming laser beam 10 only when the F number of the input coupling optics must be lowered to achieve a small focal spot 52. In a preferred embodiment, a 3.5 mm diameter collimated $CO_2$ laser beam is expanded two times and focused with a 25.4 mm focal length ZnSe lens to a focal spot of less than 55 μm. The estimated numerical aperture of the selenide HC-PBG fiber 26 (FIG. 4) for the 10.6 μm $CO_2$ laser transmission is 0.18. This translates into a total acceptance angle of 20.74°. Therefore, the total input coupling optics angle must be chosen to be less than 20.74° in order to have the total laser beam power coupled into the HC-PBG fiber without any loss. One must also consider the depth of field (DOF) in the selection of the beam expander optics (44, 46 and 48) and of the focusing element 50. Usually, the smaller is the required focal spot 52, the shorter is the DOF. The DOF is defined as the range along which the size of the laser beam is no more than 1.4 times the minimum spot size. In the example above, the DOF is about 350 μm. This means that the laser beam increases from about 55 μm in diameter at the focal spot 52 to about 77 μm diameter at a distance of 175 μm on each side of the focal spot location.

Using the input coupling optics described above and the 18 μm thick copper foil mask 14 with a 75 μm diameter of aperture 42 (see FIG. 4) would give the required protection to the periodically cladding region 28. It should be understood that both the small focal spot 52 and the short DOF require very precise alignment and positioning of the hollow core 30. Also, heating of the lenses can lead to thermal distortion of the laser beam and a problem with the focal spot location and the DOF. Water cooling of the lens holders can prevent such thermal distortion problem in the input coupling optics, and is therefore desirable especially when high-power infrared laser beam is used. Also, very precise lateral and longitudinal positioning units should be used for the lenses of the input coupling optics 12, the mask 14 and the input end of the HC-PBG fiber 26. The input coupling optics 12, the mask 14 with aperture 42, and the HC-PBG fiber 26 input end should preferably be fixed on a common supporting fixture. Although the common fixture can be temperature controlled, material for the fixture should be selected to minimize mechanical vibration and thermal expansion problems. Invar™, Kovar™, and other special alloys that have very low thermal expansion would be suitable for this purpose. Alternatively, a combination of positive and negative thermal expansion materials can be selected to obtain a total zero thermal expansion for the fixture. Also, the use of a beam dump around the mask 14 with aperture 42 at the entrance of the HC-PBG fiber 26 is useful to absorb any reflected high power laser beam. The beam dump can be made of black anodized aluminum and water cooled to remove absorbed heat.

It should also be noted that some of the laser beam reflected by the mask 14 may be transmitted back through the beam delivery path and into the laser cavity. Because the mask 14 (see FIG. 4) will be in, or near, the focal plane of the focusing element 50 (see FIG. 5), part of the energy reflected by the mask is directed back toward the laser cavity in a fairly parallel beam. Such back reflection can result in unwanted fluctuation of transmitted power, or even burn-out of the cavity optics, leading to laser damage. To avoid this problem, one can use optical techniques which provide reflection isolation for the laser source. For example, a combination of a linear polarizer with a 90° phase retarder mirror at the output of the laser source can be used to isolate the laser cavity from any reflected beam.

Figure 6:
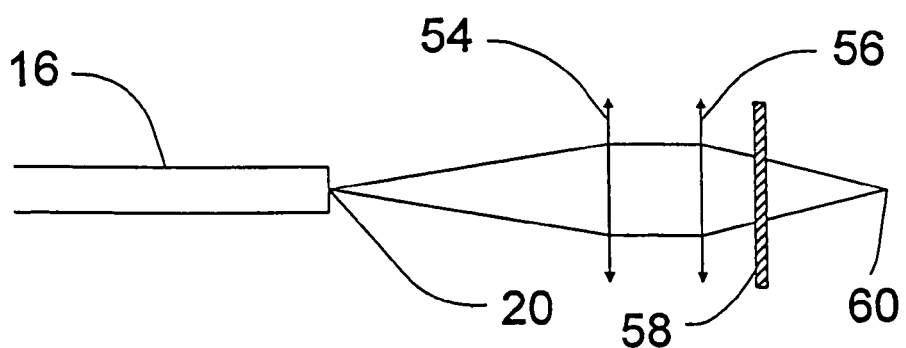
FIG. 6 illustrates a preferred embodiment of the output coupling optics used to collimate the laser beam emerging from the hollow-core photonic band gap fiber and to focus the collimated laser beam onto a target.

A preferred embodiment of the output coupling optics is illustrated in FIG. 6. The diverging output $CO_2$ laser beam 20 from the HC-PBG fiber cable 16 is collimated with the lens 54 and then focused with lens 56 to the target spot 60. The right selection of lenses 54 and 56 defines the diameter of the target spot 60, the DOF and the working distance from the target. The cover glass 58 is preferably a ZnSe window with antireflection coatings on both surfaces and is used to protect the lens 56 from any target vapor or sputter that could deposit on the output optics and cause damage. Water cooling for the lens holders is again advisable to prevent thermal distortion problem in the output coupling optics. Moreover, precise lateral and longitudinal positioning units should be used for the lenses 54 and 56. Also, a common fixture can again be used for the output end of the HC-PBG fiber and the output coupling optics to minimize mechanical vibration and thermal expansion problems.

Finally, a system or method of detecting a break or leak in the fiber optic laser beam delivery system of the present invention can be used as a safety precaution. For this purpose, a failure detection system such as disclosed in U.S. Pat. No. 4,812,641 would be suitable. Moreover, one can use a similar system to monitor the output power of the fiber optic laser beam delivery system disclosed herein.

While the invention has been described above with reference to preferred embodiments thereof, it should be understood that various modifications obvious to those skilled in the art may be made without departing from the invention as defined in the following claims.

The invention claimed is:

1. A fiber optic infrared laser beam delivery system comprising the following components:
   (a) input coupling optics adapted to focus an infrared laser beam onto a predetermined focal spot;
   (b) a hollow core photonic band gap (HC-PBG) fiber made of non-silica-based glass and having an input end and an output end, said HC-PBG fiber being held by a holding fixture in a position such that its input end faces, the input coupling optics and its hollow core at the input end constitutes the predetermined focal spot onto which the infrared laser beam is focused;

(c) a mask with an aperture having the same or slightly smaller diameter than that of the hollow core of the HC-PBG fiber, provided between the input coupling optics and the input end of the HC-PBG fiber, said mask being positioned so that its aperture is aligned with the hollow core and so that the infrared laser beam focused onto the hollow core first passes through the aperture of the mask and then enters the hollow core without touching any photonic band gap structure of the HC-PBG fiber that surrounds the hollow core at the input end; and (d) output coupling optics for the infrared laser beam emerging from the output end of the HC-PBG fiber.

2. A fiber optic infrared laser beam delivery system according to claim 1, further comprising a cooling system for selectively cooling the components of the infrared laser beam delivery system during operation thereof.

3. A fiber optic infrared laser beam delivery system according to claim 2, in which the cooling system uses water as cooling medium.

4. A fiber optic infrared laser beam delivery system according to claim 3, in which the HC-PBG fiber is provided with a soft protective coating and a watertight jacket, thereby forming an HC-PBG cable capable of being cooled by water circulation.

5. A fiber optic infrared laser beam delivery system according to claim 4, in which means are provided at the input end and the output end of the HC-PBG cable for inlet and outlet of water circulation.

6. A fiber optic infrared laser beam delivery system according to claim 1, in which the holding fixture surrounds and supports the input end of the HC-PBG fiber while allowing a small front end portion of the HC-PBG fiber to protrude out of the holding fixture.

7. A fiber optic infrared laser beam delivery system according to claim 6, in which the holding fixture is made of a metal having good thermal conductivity and is fixed to the HC-PBG fiber by a thermally conductive epoxy resin.

8. A fiber optic infrared laser beam delivery system according to claim 6, in which the holding fixture has a central recess in its front end surface, and said front end portion of the HC-PBG fiber protrudes within said recess and has a length essentially equal to the depth of said recess.

9. A fiber optic infrared laser beam delivery system according to claim 1, in which the mask is made of a material having high reflectivity in the infrared.

10. A fiber optic infrared laser beam delivery system according to claim 6, in which said material is copper foil.

11. A fiber optic infrared laser beam delivery system according to claim 10, in which the copper foil is provided with a gold plated film on the side facing the input coupling optics, to further enhance the reflectivity of said copper foil.

12. A fiber optic infrared laser beam delivery system according to claim 1, further comprising a purge gas system to prevent condensation and/or gas ionization in selected components of the infrared laser beam delivery system during operation thereof.

13. A fiber optic infrared laser beam delivery system according to claim 12, in which a sealed package with proper fittings is used to deliver the purge gas to the selected components.

14. A fiber optic infrared laser beam delivery system according to claim 12, in which dry nitrogen gas is used to prevent condensation and sulphur hexafluoride gas or carbon dioxide gas in combination with nitrogen gas are used to prevent gas ionization.

15. A fiber optic infrared laser beam delivery system according to claim 1, further comprising a laser source capable of delivering into the input coupling optics a collimated high power laser beam $\geq 10$ MW/cm$^2$ pulsed wave or $\geq 10$ W continuous wave and to operate at wavelengths above 2 µm.

16. A fiber optic infrared laser beam delivery system according to claim 1, in which the input coupling optics comprise a beam expander and a focusing element.

17. A fiber optic infrared laser beam delivery system according to claim 1, in which the HC-PBG fiber is over one meter in length and has a quasi-Gaussian fundamental mode field distribution.

18. A fiber optic infrared laser beam delivery system according to claim 1, in which the input coupling optics, the mask and the input end of the HC-PBG fiber are fixed on a common supporting fixture.

19. A fiber optic infrared laser beam delivery system according to claim 1, in which the output coupling optics comprise a lens for collimating the infrared laser beam emerging from the output end of the HC-PBG fiber and/or a lens for focusing said beam onto a target.

20. A fiber optic infrared laser beam delivery system according to claim 1, in which the output coupling optics and the output end of the HC-PBG fiber are fixed on a common supporting fixture.

* * * * *